(12) United States Patent
Battlogg et al.

(10) Patent No.: US 9,482,304 B2
(45) Date of Patent: Nov. 1, 2016

(54) METHOD FOR PRODUCING A SUBASSEMBLY AND SUBASSEMBLY

(71) Applicant: INVENTUS ENGINEERING GMBH, St. Anton I. M. (AT)

(72) Inventors: Stefan Battlogg, St. Anton I. M. (AT); Michael Kieber, Schruns (AT)

(73) Assignee: Inventus Engineering GmbH, St. Anton Im Montafon (AT)

( * ) Notice: Subject to any disclaimer, the term of this patent is extended or adjusted under 35 U.S.C. 154(b) by 105 days.

(21) Appl. No.: 14/413,836

(22) PCT Filed: Jul. 8, 2013

(86) PCT No.: PCT/EP2013/002002
§ 371 (c)(1),
(2) Date: Jan. 9, 2015

(87) PCT Pub. No.: WO2014/009000
PCT Pub. Date: Jan. 16, 2014

(65) Prior Publication Data
US 2015/0211596 A1    Jul. 30, 2015

(30) Foreign Application Priority Data
Jul. 9, 2012  (DE) .................. 10 2012 013 480

(51) Int. Cl.
*F16F 9/53* (2006.01)
*F16F 9/32* (2006.01)
*H01F 41/06* (2016.01)

(52) U.S. Cl.
CPC ............. *F16F 9/535* (2013.01); *F16F 9/3214* (2013.01); *H01F 41/06* (2013.01); *Y10T 29/49071* (2015.01); *Y10T 29/49075* (2015.01);

(Continued)

(58) Field of Classification Search
CPC .......... F16F 9/535; F16F 9/3214; F16F 9/34; F16F 9/3405; H01F 41/06; H01F 1/447; Y10T 137/2082
See application file for complete search history.

(56) References Cited

U.S. PATENT DOCUMENTS

| 5,070,971 A * | 12/1991 | Dourson ............... F16F 9/3214 188/317 |
| 6,279,700 B1 * | 8/2001 | Lisenker ................ F16F 9/535 188/267.1 |
| 7,849,983 B2 | 12/2010 | St. Clair et al. |

(Continued)

FOREIGN PATENT DOCUMENTS

| DE | 10055388 A1 | 3/2002 |
| DE | 602004005466 T2 | 1/2008 |

(Continued)

*Primary Examiner* — Vishal Sahni
(74) *Attorney, Agent, or Firm* — Laurence A. Greenberg; Werner H. Stemer; Ralph E. Locher

(57) ABSTRACT

A subassembly and a method of producing a subassembly. The subassembly has a dividing body or separating body and at least one flow channel formed on the dividing body and extending along it with at least one flow path to influence a flow of a magneto-rheological fluid along the flow channel of the dividing body. The dividing body includes a magnetic field generation device for generating a magnetic field and a field closing device. At least the magnetic field generation device and the field closing device are filled with at least one solidifying medium using a placeholder which can be removed to form the three-dimensionally predefined flow channels on the dividing body.

11 Claims, 4 Drawing Sheets

(52) U.S. Cl.
CPC ..... *Y10T29/49815* (2015.01); *Y10T 29/49821* (2015.01); *Y10T 29/49826* (2015.01)

(56) References Cited

U.S. PATENT DOCUMENTS

| | | | |
|---|---|---|---|
| 7,950,508 B2 | 5/2011 | Jin et al. | |
| 8,051,961 B2 | 11/2011 | Azekatsu et al. | |
| 8,485,324 B2 | 7/2013 | Walthert et al. | |
| 8,602,182 B2 | 12/2013 | St. Clair et al. | |
| 2002/0130001 A1* | 9/2002 | Lisenker | F16F 9/535 188/267.2 |
| 2002/0144870 A1 | 10/2002 | Lonbani et al. | |
| 2003/0000781 A1 | 1/2003 | Oliver et al. | |
| 2004/0195062 A1 | 10/2004 | Anderfaas et al. | |

FOREIGN PATENT DOCUMENTS

| | | |
|---|---|---|
| DE | 102009060550 A1 | 6/2011 |
| EP | 1273820 A2 | 1/2003 |
| JP | 2007263221 A | 10/2007 |
| JP | 2008175247 A | 7/2008 |
| JP | 2009133472 A | 6/2009 |
| JP | 2009243674 A | 10/2009 |
| WO | 03052288 A1 | 6/2003 |
| WO | 2008133720 A1 | 11/2008 |

* cited by examiner

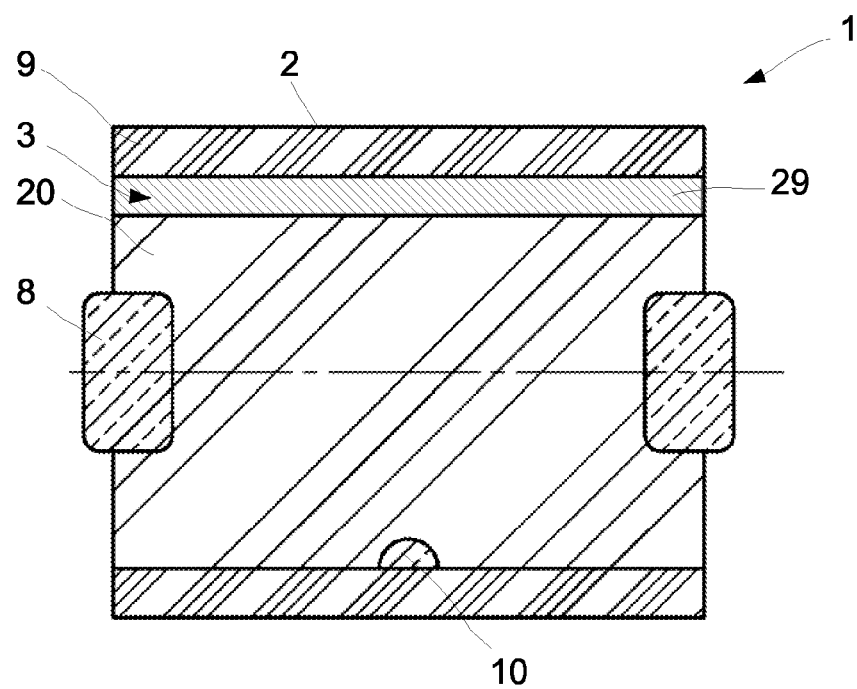
Fig. 11
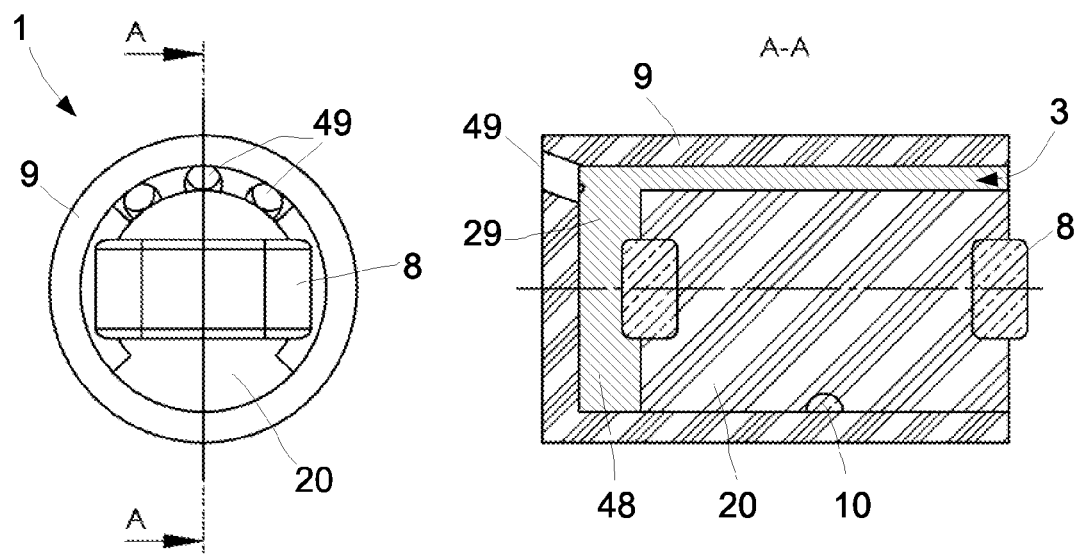
Fig. 12
Fig. 13

METHOD FOR PRODUCING A SUBASSEMBLY AND SUBASSEMBLY

BACKGROUND OF THE INVENTION

Field of the Invention

The present invention relates to a subassembly and to a method for producing a subassembly, wherein the subassembly comprises a divider with a flow passage extending thereon. The flow of a magnetorheological fluid along the flow passage is influenced by a magnetic field generating device in order to produce defined conditions.

The prior art has disclosed subassemblies in which the flow of a magnetorheological fluid is selectively attenuated or even prevented by adjustment of a corresponding magnetic field on the flow passage.

For example, dampers have been disclosed which comprise a damper piston with a magnetorheological valve, wherein the degree of damping depends on the magnetic field applied. A damping piston of this kind with a magnetorheological valve comprises a multiplicity of parts, which have to be produced carefully in order to be able to make available reproducible assembly and thus dampers without excessive series variability and hence differences in performance.

An electrically operated magnetorheological damping valve comprises an electric coil wound onto a core, a damping gap, through which the magnetorheological fluid passes, and a magnetic conductor, which closes the magnetic field. The individual components must be carefully assembled and sealed off from one another in order to ensure the desired operation, sometimes at pressures of up to 600 bar. This requires considerable effort, and therefore manufacture of such subassemblies is complex and thus relatively expensive.

US 2002/0130001 A1 has disclosed a magnetorheological fluid damper in which a piston has over its circumference an annular gap divided into four channel segments. The piston has an outer flow ring and an inner piston core, around the longitudinal axis of which a magnetic coil is wound. Four cross-shaped fastening grooves, which are provided with inward-leading through holes, are introduced into the outer surface of the flow ring in a manner distributed over the circumference. To connect the flow ring to the piston core, plastic is injected from the outside at the fastening grooves, passing through the through holes and the annular gap and forming sprues with radial projections which extend as far as the magnetic coil on the piston core. Here, the quantity injected is chosen so that a significant portion of the annular gap remains free for the flow of the magnetorheological fluid. However, a fluid damper of this kind has the disadvantage that the radial projections of the sprues have to bear very high shear forces when subjected to loading, and this can lead to problems with durability. Moreover, although using the injected quantity of plastic is supposed to ensure that a significant portion of the annular gap is left free, it is not possible to ensure a constant and reproducible shape of the annular gap that remains free since the liquid plastic flows into the annular gap differently on each occasion, and therefore considerable series variability is to be expected in manufacture.

U.S. Pat. No. 7,849,983 B2 has disclosed a magnetorheological fluid damper which has a piston with poles at the axial ends and a coil wound around the longitudinal axis of the piston. The piston runs within a cylindrical housing and divides a first magnetorheological damper chamber from a second magnetorheological damper chamber. The damping gap is provided radially between the outer surface of the piston and the radially inner surface of the cylindrical housing. During manufacture, the piston with the metallic poles and the electric coil is introduced into a casting mold, and a polymer is injected under pressure. The piston with the polymer on the outer surface thus provides a defined outer surface. However, the disadvantage of this is that the piston has to be guided with extreme accuracy in the cylindrical housing by means of a bearing arrangement in order to avoid a nonuniform gap around the circumference and to avoid contact between the piston and the inner surface of the cylindrical housing. Moreover, the cylindrical housing must be formed from a magnetically conductive material in order to be able to close the magnetic field.

It is therefore the object of the present invention to make available a method for producing a subassembly and to make available a subassembly of this kind, thus allowing reproducible production of such subassemblies at low cost.

BRIEF SUMMARY OF THE INVENTION

This object is achieved by a method having the features as claimed. The subassembly according to the invention is the subject matter of a further claim. Preferred developments are the subject matter of the dependent claims. Further advantages and features of the present invention will emerge from the general description and from the description of the illustrative embodiments.

The method according to the invention is used to produce a subassembly having a divider and at least one flow passage arranged thereon or provided therein and extending along or in the divider and having at least one flow path in order to influence a flow of a magnetorheological fluid along the flow passage or a subsection of the flow passage of the divider. In this case, the divider furthermore has a plurality of components, including at least one magnetic field generating device for generating a magnetic field and at least one field closing device. The magnetic field generating device and the field closing device are filled with at least one solidifying medium, while using at least one placeholder, to form the or at least part of the flow passage, in order to form on the divider at least one three dimensionally predefined flow passage, which is available after the removal of the placeholder.

The space maintained by the placeholder during filling is available as a three dimensionally predefined flow passage after the removal of the placeholder.

Particularly for the hydraulically leaktight connection of the components of the divider, at least the magnetic field generating device with the field closing device of the divider is encapsulated with a solidifying medium in the form of, for example, an encapsulating compound, or is overmolded with at least one injected plastic. The method according to the invention has many advantages since it allows simple production of a subassembly according to the invention. A subassembly produced by a method according to the invention has a high reproducibility and can be subjected to high loads. The method is very cost-effective for the quality achieved.

In the sense according to the present invention, the phrase stating that a flow passage extends "along" the divider is taken to mean that the flow passage extends from one end to the other end. The flow passage can be of linear design, but it can also have turns or extend in coils or obliquely from one end to the other end.

The flow of the magnetorheological fluid is influenced at least by means of a subsection of the flow passage. It is not necessary to exert an influence over the entire length.

The core is preferably surrounded by a coil holder, which is composed of plastic, for example. An electric coil device is preferably wound onto the coil holder.

The connection formed by the solidifying medium is preferably hydraulically pressuretight, forcing the magnetorheological fluid to flow via the flow passage.

It is advantageous if the magnetic field generating device is wound onto the core or the coil holder first, before filling. The core can be introduced into the magnetic field generating device before filling. At least one placeholder is positioned in the field closing device. The core with the magnetic field generating device and the field closing device is then filled, ensuring that, after the subsequent removal of the placeholder or placeholders, the at least one flow passage is available, while the divider per se is hydraulically leaktight.

It is advantageous if at least one dividing wall is arranged on the coil holder in order to divide the flow passage into two or more flow paths.

For production, an insert or an inserted part or a push-in part is formed, being formed, for example, from a stack comprising a first dividing template as a placeholder, at least one dividing wall and at least one second dividing template as a placeholder.

It is also possible here for an insert to be formed from one or more placeholders. An individual placeholder or a placeholder made up of one or more parts is used, for example, if a flow passage is not divided into partial passages. If, on the other hand, the flow passage is to be divided into a plurality of flow paths, the insert comprises a stack of different components, which are stacked one on top of the other.

During assembly, the core is preferably introduced with the coil holder and the electric coil device and at least one insert into the field closing device. The field closing device is preferably introduced into a mold before or afterward. Encapsulation with the solidifying medium in the form, for example, of an encapsulating compound is then carried out, or plastic or other materials advantageous for this purpose is/are injected. Encapsulation can take place at normal pressure, but can also take place using reduced pressure and/or excess pressure.

In all the embodiments, the solidifying medium is preferably cured after the casting operation. Curing can be assisted by temperature adjustment. The use of UV radiation or some other radiation, for example, is also possible in order to accelerate the solidification process. The use of chemical agents is also possible.

Analogously, some other suitable method, such as injection molding (of plastics) can be used instead of encapsulation.

The embodiments illustrated show the use of a structure according to the invention in a damper, e.g. as a shock damper in a vehicle, bicycle or prosthesis. Analogously, the structure can be used without a movable piston and piston rod as a valve.

In all embodiments, at least one placeholder is removed after the curing process in order to free the flow passage and/or the flow paths of the flow passage.

In particular, a subassembly according to the invention is produced by one of the methods described above. The subassembly according to the invention has a divider and at least one flow passage provided thereon and extending through the divider or along the divider and having at least one flow path in order to influence a flow of a magnetorheological fluid along the flow passage—or in subsections thereof—of the divider. The divider comprises at least one magnetic field generating device for generating a magnetic field and one field closing device. The field closing device with the magnetic field generating device is filled with a solidifying medium, while using at least one placeholder, such that the divider has at least one three dimensionally predefined flow passage. After the removal of the placeholder, the flow passage is available.

The subassembly according to the invention has many advantages since it can be produced easily and reproducibly and allows functionally reliable operation.

The subassembly according to the invention preferably makes available a hydraulically leaktight divider which, in particular, allows flow only through the flow passage arranged thereon or through the flow connections provided thereon. In this case, the flow capacity depends, in particular, on the magnetic field of the magnetic field generating device. Without a magnetic field, a magnetorheological fluid can pass substantially unhindered through the flow passage. With a strong magnetic field, the through flow of a magnetorheological fluid can also preferably be completely prevented.

The solidifying medium can be at least one encapsulating compound or contain such a compound. The solidifying medium can be cast or injected. For example, it is possible to use at least one medium which is or becomes liquid under certain conditions and is then cast or injected and then cures. The solidifying medium can be a medium which cures or can contain at least one such medium, for example.

The magnetic field generating device with the field closing device of the divider is preferably filled and/or encapsulated and/or overmolded with a solidifying medium.

Owing to the fact that the components of the divider are, in particular, encapsulated together and are thus firmly connected to one another by the solidifying medium, durable functioning can be reliably ensured. In the case of subassemblies from the prior art, in contrast, it is generally necessary to connect each individual component to the other components and seal them off from the other components in a complex process. Such an assembly process is complex and, at the same time, prone to error. The subassembly according to the invention, on the other hand, makes available a functionally reliable subassembly in a simple manner. At the same time, the solidifying medium ensures a firm and permanently leaktight connection between the individual components, even if these exhibit inaccuracies owing to relatively large variations in the manufacturing tolerances or indeed surface imperfections or roughness.

As a solidifying medium, it is possible, for example, to use an encapsulating compound and/or a solidifying and, in particular, curing casting compound. It is possible, for example, for a two component material to be used as a solidifying medium, which is initially capable of being processed in a flexible manner and then automatically cures. Here, curing can take place under defined conditions, e.g. an increased temperature. However, it is also possible for curing to take place without special conditions, e.g. at room temperature.

In particular, a hydraulically leaktight connection between the components of the divider is made possible. In particular, the solidifying medium restricts the flow of the magnetorheological fluid substantially and preferably virtually completely to the flow passages. However, it is also possible for at least one separate bypass passage to be provided.

Through the use of one or, indeed, at least one placeholder, a spatially precisely defined shape of the flow passage is made possible. The placeholder can be of one-piece design. The placeholder can also consist of a plurality of individual parts. After filling, the placeholder is removed and is preferably reusable. The placeholder can consist of a dividing template or can comprise at least one such template. The dividing template can be metallic or can consist of some other suitable material.

The use of a placeholder composed of a material such as wax or the use of a eutectic metal is also possible. After the filling process, the placeholder can then be washed out or melted out of the divider. Dissolving with chemical agents is also possible.

The placeholder itself or the melted material can be reused.

At least one flow passage is preferably divided by at least one dividing wall into at least two flow paths. Here, a flow path can also be regarded as a partial passage. The at least two flow paths are preferably divided from one another at least partially and, in particular, completely over the entire length thereof. By means of such a dividing wall, which can be embodied essentially as a thin and, preferably, ferromagnetic dividing plate, for example, without being restricted thereto, the flow passage is divided by simple means into two partial passages or flow paths. Even more effective influencing of the flow through the flow passage is thereby possible. In simple cases, a thin dividing plate is used as a dividing wall. The dividing wall is preferably thin relative to the height of a flow path of the flow passage. As a result, the full flow cross section is reduced only slightly, thereby making it possible to maintain a small overall size. In this case, the faces of the dividing wall can have contours which are advantageous in terms of flow engineering.

As a particularly preferred option, the dividing wall is designed as a separate dividing plate and is encapsulated with the divider by means of the solidifying medium. Simple manufacture and a durable subassembly are thereby made possible.

The dividing wall preferably has at least one latching device, which latches with the solidifying medium and/or with other components of the divider, thus making it possible to ensure reliable operation, even at high pressures. In particular, two, three or more latching devices in the form of latching teeth, latching hooks, latching eyes or latching grooves or the like, for example, are provided in order to allow a firm connection between the dividing wall and the divider.

In all the embodiments, at least one flow path has a shallow cross section in the flow direction, wherein said cross section can be straight or in an arc shape. In particular, a width of the flow path is more than twice and, in particular, at least four times a height of the flow path in the direction of the field lines. In particular, the length of the flow path in the flow direction is greater than a height of the flow path transversely to the flow direction. Effective influencing of the magnetorheological particles in the magnetorheological fluid is made possible by a shallow gap as a flow path, making possible finely graduated or continuous adjustment of the flow resistance through the flow passage, right up to blocking.

In all the embodiments, there is a particular preference for at least one magnetic field generating device to be designed as an electric coil device, to which at least one core composed of a ferromagnetic material is assigned. In particular, the electric coil device and the core are encapsulated with the divider by means of the solidifying medium.

An electric coil device allows a flexible, quick and defined change in the effective magnetic field in a short time, thus making possible real-time control of the influencing of the flow resistance through the flow passage of the dividing device, for example.

In particularly preferred embodiments, the core has at least one lateral constriction transversely to the longitudinal axis thereof. This constriction can be formed on one or more longitudinal sides and/or end faces of the core or can be designed to run completely around the core. As a result, a smaller overall volume is made possible, offering considerable advantages in the case of subassemblies where overall volume is a difficult issue.

By means of the constriction, the ferromagnetic material of the core, the saturation flux density of which is generally significantly higher than the saturation flux density of the flowing fluid, is better utilized. Moreover, the mean winding length of the coil can be reduced, which can significantly improve the electrical properties thereof.

It is advantageous if the core is surrounded by a coil holder, on which the electric coil device is mounted.

The coil holder can be composed of a plastic, for example, and facilitates the winding of the coil. At the same time, damage to the windings at the edges of the iron core is avoided during winding or during subsequent operation. It is also possible to wind the coil directly onto the coil holder and to insert the core later. The coil holder preferably allows coaxial positioning, e.g. if the divider is designed as a piston.

At least one flow path is preferably arranged between a pole cap of the core and the field closing device. Such an embodiment allows particularly effective use of the magnetic field which emerges from the pole cap, crosses the flow path and is directed back via the field closing device, thus making available an effective subassembly.

In particular, at least one pole cap is rounded and is preferably designed substantially as a cylinder segment and at least substantially adjoins a flow path.

In preferred embodiments, the divider is designed as a piston and, as such, is arranged movably in a piston guide. The piston is preferably connected to a piston rod. However, the piston can also be connected to piston rods on both sides—i.e. what is referred to as a continuous piston rod. At least one piston rod is preferably screwed on, in or against.

In such embodiments, it is preferred if the electric coil device is aligned transversely to a longitudinal axis of the piston guide. This means that the electric coil device is not arranged parallel to the piston movement but, in particular, is arranged perpendicularly thereto. However, it is also possible for the coil device to be embodied parallel to the piston movement (coaxial coil).

An axis of the electric coil device is preferably aligned transversely to a longitudinal axis of the piston guide. The field closing device preferably forms a piston main body. The piston main body is composed of a ferromagnetic material, such as a ferrous material, for example.

In such embodiments, the field closing device preferably surrounds the electric coil device in a circumferential direction of the piston. In the case of a horizontal arrangement of the electric coil device, when the electric coil device is arranged transversely to the longitudinal axis of the piston, it is thereby possible for the field closing device to effectively close the field, thus allowing a simple and effective structure.

In all the embodiments, it is particularly preferred if the piston main body has at least one undercut, grooves, slots, irregularities, a very rough surface or the like, which are filled at least partially with the solidifying medium or the encapsulating or injection compound. By means of such an embodiment, a particularly firm connection is ensured within the divider, thus ensuring that the subassembly is sufficiently stable, even at high and very high differential pressures on both sides of the divider of 100, 200, 400 or even 600 bar.

Further advantages and properties of the present invention will emerge from the description of the illustrative embodiments, which are explained below with reference to the attached figures.

BRIEF DESCRIPTION OF THE SEVERAL VIEWS OF THE DRAWING

FIG. 11 shows a highly schematized cross-sectional illustration of another subassembly;

FIG. 12 shows a highly schematized front view of another subassembly; and

FIG. 13 shows a cross-sectional illustration of the subassembly according to FIG. 12.

DESCRIPTION OF THE INVENTION

Figure 1:
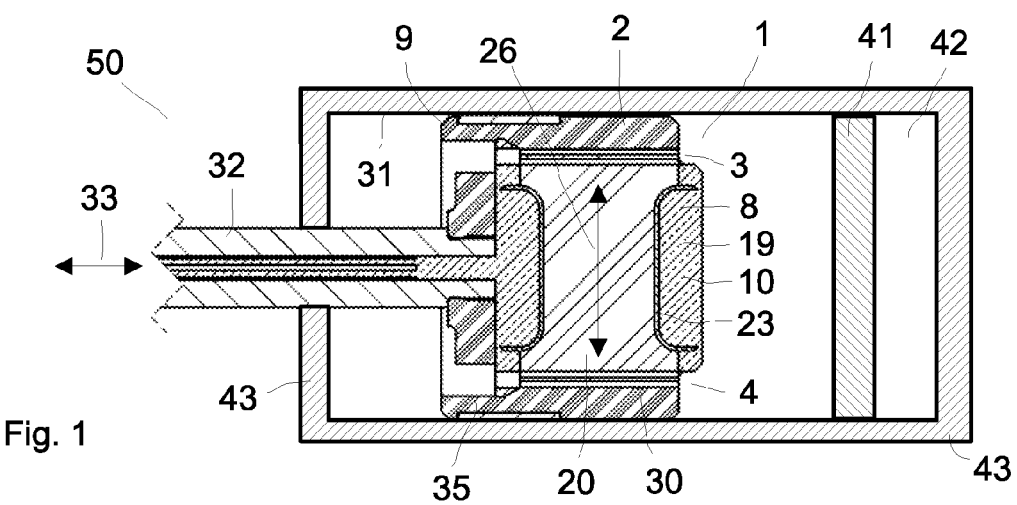
FIG. 1 shows a schematic cross section through a subassembly according to the invention, which is embodied as a damper.

In FIG. 1, a damper 50 according to the invention is depicted in a highly schematized cross section. The damper 50 has a housing 43, in which the subassembly 1 acts as a piston 30. Connected to the piston 30 is a piston rod 32, which extends outward out of the housing 43.

It is likewise possible for a valve according to the invention to be made available. The invention is not restricted to the structure of a damper but can also be directed to a valve. In this case, such a valve can be inserted in a damper, for example, although this is not the only possibility. As a valve for a damper, it can be inserted in the piston or take the form of an external valve, for example.

In the damper 50 in FIG. 1, a compensating space 42, which is separated from the remaining volume of the damper 50 by a dividing piston 41, is provided to compensate for the volume of the piston rod 32. It is also possible to use a respective piston rod on each face of the piston, thereby allowing the compensating space and the dividing piston to be eliminated. The seal 51 serves as a sealing means (sliding seal) between the moving piston 35 and the housing 43. The seal 51 can also be a permanent magnet seal.

The subassembly 1 serving as a piston 30 serves as a divider 2 and has a magnetic field generating device 8, which is here designed as an electric coil device 19.

In the section according to FIG. 1, the core 20 can be seen, which is surrounded by a coil holder 23 made of plastic. The electric coil device is wound around the coil holder 23.

The piston 30 comprises the piston main body 35, which simultaneously serves as a field closing device 9 and is here designed as a ring-shaped conductor. In the illustration according to FIG. 1, the flow passages 3 and 4 can be seen, which are each divided here into two respective flow paths 5 and 6 by dividing walls 11.

Figure 2:
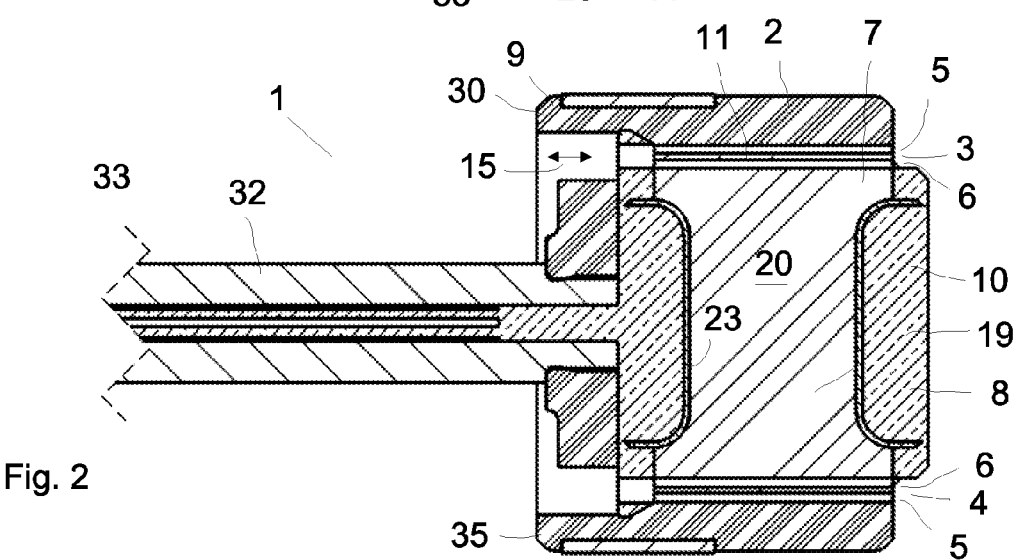
FIG. 2 shows a schematic cross section through a subassembly 1.

FIG. 2 shows, in a somewhat enlarged view, a subassembly 1, which is here likewise embodied as a piston 30. The piston 30 is connected to a piston rod 32. The piston main body 35 and the core 20 and the coil holder 23 each form components 7, which are here connected to one another within the divider 2 by the solidifying medium 10 in the form, for example, of an encapsulating compound 10 or of a plastic. Flow through the piston 30 can take place in the flow direction 15 through the flow passages 3 and 4.

Figure 3:
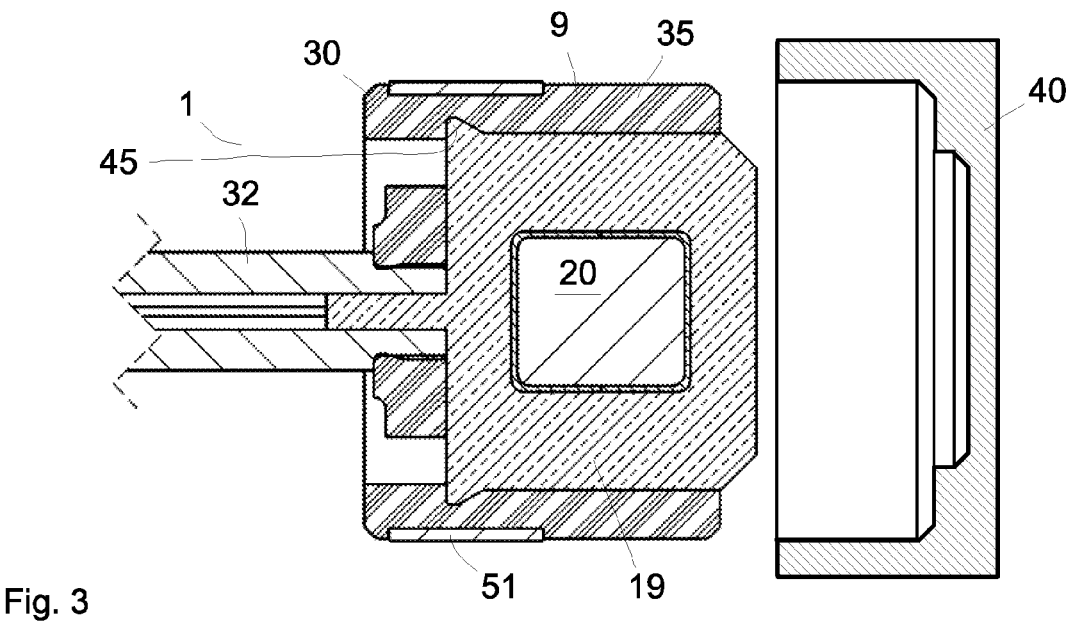
FIG. 3 shows a cross section through the subassembly according to FIG. 2, at right angles to the illustration according to FIG. 2.

FIG. 3 shows the subassembly 1 according to FIG. 2 in a section which is arranged at right angles to the section according to FIG. 2. Here, the core 20 is depicted along the longitudinal extent 26 thereof. The core 20 is surrounded by the coil device 19, the individual windings of which here extend substantially parallel to the plane of the paper. Provided in the piston main body 35 is an undercut 45 or a groove, which has filled with the solidifying medium 10 during the encapsulation or injection process. After curing, the undercut 45 forms an effective safeguard (positive engagement), reliably preventing the electric coil devices 19 from being pulled or pushed out of the piston main body 35, even at high pressures.

In addition, FIG. 3 also shows a mold 40, into which the subassembly 1 is inserted during assembly, before the solidifying medium is added in order to ensure a hydraulically leaktight connection within the divider 2. The mold 40 has a form matched to the envisaged external shape of the subassembly 1. By means of the external shape, the piston and, especially, the approach-flow region of the flow passages 3, 4 can be optimized in terms of flow engineering, and, in this case, the solidifying medium 10 in the form of the encapsulating compound, for example, can cover virtually the entire end-face area of the piston main body 35.

Additional molds can be used analogously to mold 40, e.g. in order to configure the opposite area. The flow passages formed by the piston main body in FIG. 3 and the fastening of the piston rod, in particular, can also be accomplished by a correspondingly shaped solidifying medium.

Figure 4:
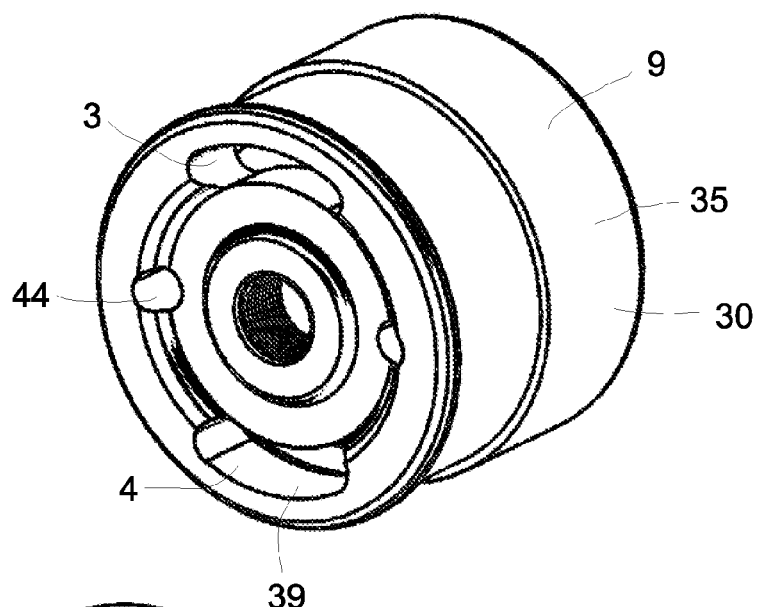
FIG. 4 shows a piston for a subassembly according to the invention.

FIG. 4 shows a piston main body 35 for the subassembly 1 according to FIG. 2 or FIG. 1. Here, the piston main body 35 serves as a field closing device and carries the magnetic field back again after passage through the flow passage. The flow passages 3 and 4 are clearly visible here. The flow passages 3 and 4 each have a shallow cross section 39. Assembly holes 44 are furthermore provided, being used, for example, for handling with a matching tool. The inflow and outflow contours of the flow passages 3 and 4 can be embodied in an advantageous way in terms of flow engineering by rounding the edges, profiling etc.

An embodiment which is preferred in the case of cost sensitive applications, in which the ferromagnetic piston main body 35 is dispensed with or can be composed of plastic or a comparable material, is not shown. In this case, the piston main body can be produced in the working step in which the coil is encapsulated or overmolded and the dividing walls are fixed. It is particularly advantageous to encapsulate or overmold the piston rod in the same operation.

With such a structure, the magnetic circuit can be closed by means of the housing 43. If the dividing walls or flow passages are situated radially on the very outside of the piston, there is no plastic or no encapsulating compound in the magnetic circuit.

It is also possible, in addition to the flow passage 3 (and 4) situated in the magnetic field, to produce at least one flow passage not situated in the magnetic field, e.g. in the form of a simple hole, by means of the methods described above (bypass passage). One possible position would be between the passages 3 and 4 viewed in relation to the end face, as an extension of the assembly hole 44, giving rise to a bypass passage. By way of example, this can be accomplished by means of a placeholder 29 in the form of a simple wire, which is removed after the encapsulation process. This wire can be between 0.1 mm and 10 mm thick, for example. The placeholder 29 can also be encased, wherein the outer circumferential surface bonds to the encapsulating compound, and the placeholder (wire) can be pulled out. It is thereby possible to dispense with a release agent for easier removal, and this facilitates the process. The inner circumferential surface can preferably be provided with an anti-friction layer, thereby facilitating removal.

Figure 5:
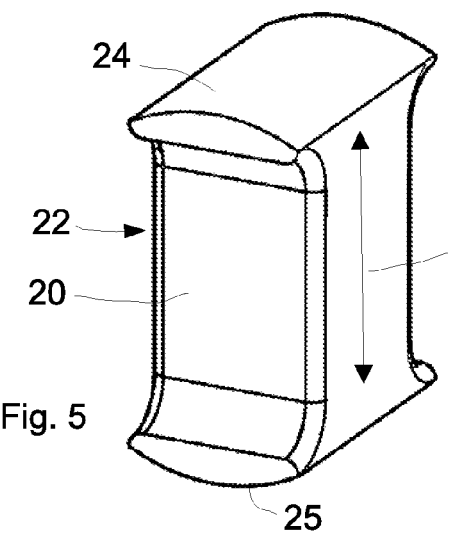
FIG. 5 shows a core for the subassembly according to FIG. 2.

FIG. 5 shows the core of the subassembly 1 from FIG. 2, illustrated separately and an enlarged scale. The pole caps 24 and 25 are rounded and are here matched to the radius of the piston 30 or to the internal radius of the flow passages 3 and 4. Pole cap 24 adjoins the damping passage 3 and, in particular, the flow path 6 of flow passage 3. Here, pole cap 25 directly adjoins the flow path 6 of flow passage 4. It is also possible for the pole caps 24 and 25 to be coated with a thin layer, for example, with the result that there is a small spacing between the actual pole caps 24 and 25 and the flow passages 3 and 4 respectively.

The core 20 can also be produced from a plurality of parts, wherein these core parts can have different magnetic properties. In this case, regions of the core can be hard-magnetic and other regions can be magnetically nonconductive (not ferromagnetic. The multi-part structure of the core also makes it possible to insert the core into the coil holder 23 only after the winding of the coil.

Figure 6:
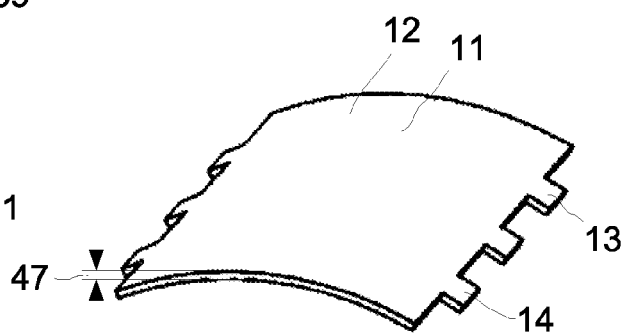
FIG. 6 shows a dividing wall for the subassembly according to FIG. 2.

FIG. 6 shows a dividing wall 11 embodied as a dividing plate 12, which here has latching devices 13 in the form of latching teeth 14. By means of the latching devices 13 or latching teeth 14, the dividing wall 11 interlocks with the solidifying medium during encapsulation, ensuring that the dividing wall 11 is accommodated in the subassembly 1 reliably and in a defined and spatially fixed manner.

At least one film, adhesive tape, layer or coating which forms the placeholder during the encapsulation process and is then chemically dissolved, etched away or melted out can be applied to the dividing plate 12 in the central area and preferably on both sides. The flow passage is thereby formed. The placeholder can also be composed of a eutectic metal, which is melted and removed again after the encapsulation process.

Figure 7:
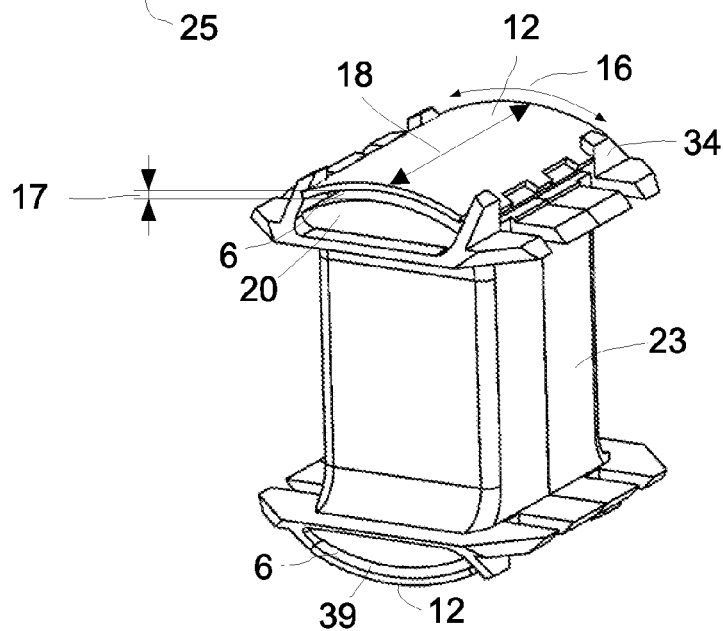
FIG. 7 shows the core with a coil holder and dividing walls for the subassembly according to FIG. 2.

FIG. 7 shows the core 20, which is surrounded by a coil holder 23 and on which two dividing plates 12 are additionally placed. A flow path 6 of the flow passages 3 and 4 can be seen between each of the pole caps 24 and 25 and the dividing plates 12. Latching means 34, which are used to receive the dividing walls 11 in a defined manner, are provided on the coil holder 23.

Transversely to its longitudinal axis 21, the core 20 here has constrictions 22, thus saving overall volume in the axial direction of the piston 30. Owing to the constrictions 22, the coil 19 expands less far in the axial direction, thus allowing an axially shorter subassembly 1.

Here, the flow passages 3 and 4 have a length 18 in flow direction 15 which is considerably greater than a height 17 in the direction of the longitudinal axis 21 of the core 20. Here, the width 16 of the flow paths 5 and 6 of the flow passages 3 and 4 extends along a curved line and is likewise considerably greater than the height 17 of the individual flow paths 5 and 6.

Typical values for the length 18 of the flow passages 3 and 4 are between about 10 and 60 mm. The width 16 is generally between about 5 mm and 20 mm, and preferred passage heights 17 are between about 0.2 and 2 mm.

In this case, a plurality of flow paths can be provided. For example, five, six, eight, nine or ten flow paths can be associated with one flow passage. It is also possible for three, four or more flow passages to be provided. Typically, the wall thickness of the dividing walls 11 is between 0.1 mm and 1 mm.

The free flow cross section as the sum of all the flow passages is dependent on the shape of the passages, the fluid used, the piston area and the desired force range. Typical flow cross sections are in a range between about 10 mm$^2$ and about 200 mm$^2$. Mean flow velocities of up to 30 m/s or even 60 m/s or above are possible. Of course, the volume flow depends on the dimensions and, in some examples, can reach and exceed 100 ml per second. Indeed, values of 200 ml per second or 300 ml per second and even more are also possible. The electric coil device 19 can be composed of different materials. For example, it can be formed from copper or even from anodized aluminum or the like. It is also possible for a plurality of coil devices 19 to be provided.

The dividing plate 12 can also be embodied as a planar plate, and this, together with a core 20 with planar pole caps 24, gives a planar flow passage situated therebetween.

Figure 8:
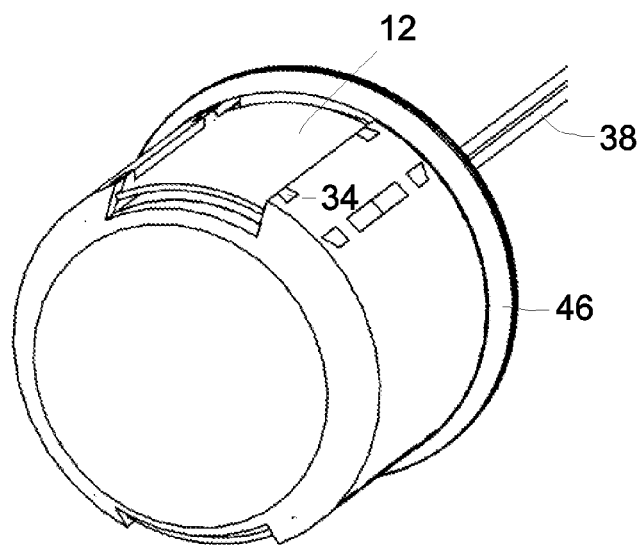
FIG. 8 shows a perspective illustration of the subassembly 1 without a field closing device.

A subassembly 1 without the piston main body 35 is depicted in perspective view in FIG. 8. The cables 38, which lead to the electric coil device 19 in the interior, and the dividing plates 12, which divide each of the the flow passages 3 and 4 into two flow paths 5 and 6, respectively, are clearly visible. The latching means 34 for the axial fixing of the dividing walls 11 or dividing plates 12 are visible and, in the fully assembled state, rest against the inside of the piston main body 35. FIG. 8 and also FIG. 9 show the state after encapsulation with the solidifying medium, although the piston main body 35 has been omitted in the illustrations for greater clarity in each case.

The offset 46, which consists of the solidifying medium 10 and, in this case, of the encapsulating compound or of an injected plastic 10 and fills the undercut 45 in the piston main body 35, is also clearly visible.

Figure 9:
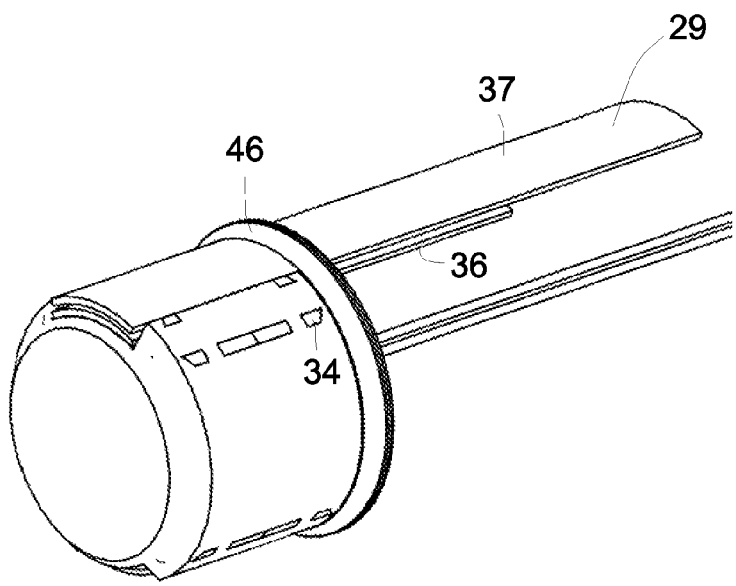
FIG. 9 shows a perspective illustration of the subassembly 1 without the field closing device.

In FIG. 9, the placeholders 29 in the form of dividing templates 36 and 37 are still inserted in the subassembly 1. After curing, the dividing templates 36 and 37 can be removed, leaving the flow channels 3 and 4 or flow paths 5 and 6 with precisely defined dimensions. For this purpose, the dividing templates 36 and 37 are pulled out in an axial direction. The dividing templates can also be part of the mold 40 shown in FIG. 3. The dividing templates are also pulled out in an axial direction along with or after the removal of the mold 40.

The dividing templates 36 and 37, which can thus be reused, can be brought precisely to the desired dimensions by means of a grinding operation or the like, for example, allowing highly accurate subassemblies 1 to be manufactured in a reproducible manner.

It is also possible to chemically dissolve or melt the placeholders 29 or dividing templates 36 and 37, for example. In that case, new dividing templates 36 and 37 are required for each subassembly. However, the melted material can be reused directly or after cleaning or filtering.

Figure 10:
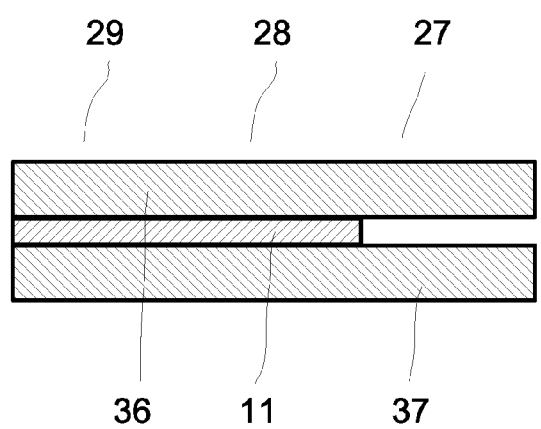
FIG. 10 shows a schematic illustration of a stack.

It is also possible to surround the placeholder 29 or dividing templates 36 and 37 with a movable shell/sleeve, wherein the outer circumferential surface bonds to the encapsulating compound and the placeholder 29 can be pulled out. FIG. 10 shows a stack 28 as a placeholder 29, which serves as an insert in a subassembly 1. For this purpose, the dividing template 36 or 37 is first of all laid down, and the dividing wall 11 is then applied before the second dividing template 37 or 36 is laid down. Together with the core 20, which is surrounded by the coil holder 23 and the coil 19, the insert 27 is introduced into the piston main body 35. Both are introduced into the mold 40 before the cavities are filled with solidifying medium 10.

In order to avoid air inclusions, it is possible to operate under a vacuum and/or under excess pressure.

Instead of the stack 28 described above, consisting of a dividing wall 11 and respective dividing templates 36 and 37, it is also possible to install in the same overall volume a stack consisting of, for example, two thinner dividing walls combined with three thinner dividing plates. The dimensions and shapes of the core 20, of the piston main housing 35 and of the coil holder 23 together with the coil 19 do not have to be altered for this purpose since the solidifying medium compensates for the differences and fixes all the components as it solidifies. It is thus possible to produce different flow passage designs (variants) without major effort.

A stack can contain any number of dividing walls 11, it being possible for typical stacks to contain one to ten or twenty or more dividing walls. For assembly, the number of dividing walls+ a placeholder 29 is generally used.

FIG. 11 shows a highly schematized cross-sectional illustration of another subassembly 1 according to the invention, which comprises a divider 2. The divider 2 has a field closing device 9, a flow passage 3 in the divider 2, a core 20 and an electric coil as a field generating device 8. The divider 2 is filled by means of a solidifying medium 10. Before filling, an insert 27 has been introduced as a placeholder 29. The placeholder 29 ensures the formation of a spatially defined and reproducible flow passage 3 in the divider 2. The placeholder can be designed as a dividing template or can be composed of a material which can be washed out, melted or dissolved, which is removed again after solidification or curing. Consequently, the placeholder can be composed of metal or, alternatively, can be manufactured from wax, for example.

To ensure a pressuretight connection (leaktightness . . . ) between the component 7 and the field closing device 9 in the regions which are not fully encapsulated (e.g. relative to the flow passage), the core 20 has in these regions at least one recess which is filled with encapsulating compound or the medium 10 during the encapsulation process.

FIG. 12 shows a highly schematized front view of another subassembly 1, which, as in the example shown in FIG. 11, comprises a flow passage 3 with just a single flow path. Here, the flow passage 3 is not subdivided. FIG. 13 shows a cross-sectional illustration of the subassembly 1 shown in FIG. 12. Once again, the divider 2 has a field closing device 9, a flow passage 3 in the divider 2, a core 20 and an electric coil as a field generating device 8.

A space must remain free between the magnetic field generating device 8 and the inner end face of the field closing device 9. This is achieved by inserting a placeholder 29 made of wax, for example. After encapsulation, this is removed by melting. It is also possible to use other materials customary for encapsulation processes instead of wax. The placeholder 29 can also be shaped in such a way that it shapes the flow passage in a corresponding way. The space to be kept free or in a multiplicity thereof can be at any desired position of the subassembly.

It is also possible to use other meltable media, thermoplastics etc. as placeholders 29 in order to enable the placeholder 29 to be removed again by melting after filling.

Here, a collecting space 48 is provided at one end of the divider 2, said space being connected to the adjacent chamber by a plurality, in this case three, openings 49. It is also possible for two different placeholders 29 to be inserted, namely, for example, a dividing template 36 for the formation of the flow passage 3 and another placeholder to form the collecting space 48.

The field closing device 9 can be provided at one or both ends with threads, on which a piston rod, for example, is secured.

Through the defined method of working and the defined dimensions of the dividing walls and of the dividing templates it is possible to produce highly accurate subassemblies at low cost and in a simple manner in relatively large numbers. By virtue of the accurate tolerances, it is also possible to divide a flow passage into many flow paths, which are divided from one another by the dividing walls as partitions. Since all the individual parts are manufactured with high accuracy, the cumulative tolerance is low. That is very advantageous since considerable loads can act on the individual flow paths or flow passages if the dimensions of the individual flow passages or flow paths are different, and these can lead to bending of dividing walls 11 or dividing plates 12.

In all cases, the dividing walls can be embodied as bent partitions in a round piston. The piston rod can be screwed or adhesively bonded.

If a large number of dividing walls 11 are stacked as partitions, the individual tolerances accumulate to give a larger cumulative tolerance, which can be disadvantageous in the case of the series-produced part. In that case, the performance of individual actuators can differ widely. To manufacture the individual parts with high accuracy, so that the cumulative tolerance is low, is complex and expensive in series production. The invention makes available an advantageous subassembly 1 and an advantageous method for production. It is thus possible to make available a subassembly with lower overall tolerances with mass-produced individual parts having, in some circumstances, even greater tolerances (=cheaper).

In particular, it is also possible for all components to be hydraulically leaktight, even in the case of high pressures/forces.

The subassembly can respond adaptively through magnetic field changes, resulting as it were in a change in viscosity of the liquid. The control of high pressures is a significant advantage of the partitioned structure (in the case of a small overall volume, especially of short length).

The dividing walls 11—also referred to as partitions—are often embodied so as to be thin and, in preferred embodiments, have thicknesses 47 between about 0.3 mm and 0.7 mm. It is thereby possible to save overall volume and overall height. The height 17 of the flow paths 5, 6 is, in particular, between 0.2 mm and 2 mm. In the case of certain structures, e.g. energy absorbers for steering systems, a multiplicity and, specifically, fourteen dividing walls 11 as partitions, for example, can be stacked one on top of the other. With two such packs, it is possible to make available a total of 30 passages or more, which are subjected to pressures of up to 600 bar or high surface loads of 60 N/mm² or above resulting therefrom.

However, if the flow paths 5, 6 each have very different spacings, this results in a different magnetic field strength when a magnetic field is applied: the magnetic field in the higher flow path is lower than in the gap which is not so high or in the lower flow path. The different magnetic field influences the magnetorheological fluid differently, and a lower pressure is established in the higher flow path, and a higher pressure is established in the lower flow path. This can lead to considerable transverse loads on the dividing walls 11, which may bend and even be destroyed.

However, irrespective of this, even if the magnetic field is absolutely the same, the height of the gap or of the flow path in the direction of the field lines is decisive since a lower height leads to a higher possible counterpressure. Different heights of different flow paths lead to different counterpressures and, as a result, to pressure differences.

The pressure differences between individual dividing walls 11 lead to force differences on the dividing walls 11, which can lead to deformations of the thin partitions 12. Particularly at high pressures, such a deformation can cause material overloading and deficient functioning of the actuator. This can even be to the extent that two dividing plates 12 touch owing to the deformation, leading to a magnetic short circuit and hence to an almost complete pressure drop in one flow passage or in one flow path. Unforeseen leaks in individual passages (leakage) may cause similar loads or disadvantages.

Through uniform approach flow, the invention enables bending of the dividing plates 12 to be avoided.

One advantage of encapsulation-induced or adhesive bonding of the electric coil device 19 to the dividing walls 11 is that the dividing walls 12 are also fixed during the encapsulation process.

The toothing in the lateral outer region of the dividing walls 11 allows positive engagement in the divider 2. The constriction of the iron core 20 allows a saving the of overall volume, this being important for the stroke length and overall length.

The undercut 45 in the piston 30 serves for positive engagement of the assembly comprising the electric coil device 19, the core 20 and the coil holder with the piston 30. The undercut 45 can also be embodied as a round or angular notch or as toothing. The undercut also ensures leaktightness.

Here, bent dividing walls 11 offer better energy efficiency. Straight dividing walls have advantages in terms of production costs.

The coil holder 23 holds the dividing walls 11 in the axial direction before encapsulation. The dividing walls 11 are held in the radial direction by means of the dividing templates 36 and 37 before encapsulation.

During the production process, the parts which cannot be removed from the mold are first of all cleaned. The parts which can be removed from the mold are greased or oiled. A special release agent can also be used.

The cable 38 is then soldered on or connected to the coil 19. The piston 30 is screwed and/or adhesively bonded to the piston rod 32.

A sandwich of the coil 19, dividing templates 36 and 37 and dividing walls 11 is assembled with the inserted part 27 or stack 28. All tolerances are compensated for by the thickness, especially the defined thickness, of the dividing walls 11 of the partition plate.

The sandwich is pushed into the piston 30. If an encapsulating compound or a plastic is used as the solidifying medium, this may be heated up. If a vacuum unit is used, the piston is positioned in an appropriate manner, the vacuum bell is closed and the vacuum pump is switched on. Owing to the vacuum, the air is sucked out of the piston 30, and the solidifying medium 10 flows into the piston, ensuring that as few air inclusions as possible occur. Air inclusions can have a bad effect on leaktightness and on the fixing of the components.

After curing, release from the mold can take place, with the dividing templates 36 and 37 being pulled out of the piston. The dividing templates 36 and 37 can also be part of the mold 40 or can be connected detachably to the mold and removed jointly during mold release.

Finally, the remaining solidifying medium or encapsulating compound 10 is cleaned off the flow passages 3, 4, if necessary.

The latching devices 13 on the dividing walls 11 can be round, triangular or polygonal, for example. Barbs can be provided. The teeth can also be bent and turned downward, for example.

The dividing walls 11 are preferably composed of a magnetically conductive (ferromagnetic) material. The wall thickness is preferably constant but can also differ. The thickness of the dividing wall can also vary (e.g. conically) over the width 16, as seen transversely to the flow direction or in the flow direction. The dividing walls can also have any other shapes, e.g. corrugated. It is also possible for two or more dividing walls with different configurations, shape or material to be arranged one behind the other. It is also possible to leave a gap between the dividing walls arranged one behind the other, as seen in the flow direction, before encapsulation, said gap subsequently being filled by the solidifying medium. It is also possible to integrate a sensor, e.g. a magnetic field strength or temperature sensor, into said gap and then to encapsulate or overmold it.

In the case of high pressure actuators, high forces may arise in the flow direction due to the end face and the dissipation of the shear stresses of the magnetorheological fluid (MRF). Overlapping encapsulation enables this to be dissipated efficiently and acts like an extensive adhesive bond.

The surface of the dividing walls 11 can be smooth, but is preferably rough or roughened, at least locally. This gives a better bond with the solidifying medium.

The core composed of a ferromagnetic material can be constricted at the end faces and/or laterally, thus allowing more windings for the same overall volume. It is also possible for the core to be composed of hard magnetic material, e.g. AlNICo, or a permanent magnet can also be integrated into the core in order to produce a defined magnetic field without a current so as to achieve a defined basic force.

Since the dividing templates 36 and 37 as placeholders 29 can preferably be used several times, they can be produced with high accuracy, e.g. by grinding. In this way, the higher production costs of the dividing templates are spread over a large number of components.

In order virtually to eliminate manufacturing tolerances, the precision dividing templates are combined with dividing walls of the correct thickness and then installed.

The placeholders 29 or 36, 37 can also be manufactured with an undersize and shaped in such a way that they distribute the height tolerance as uniformly as possible between all the flow channels through thickness tolerances of the dividing walls 11. The inclusions of solidifying medium or of the encapsulating compound which may occur in the flow passages here are generally very thin walled and can subsequently be removed.

The cable 38 is preferably encapsulated in the piston rod 32 at the same time. In addition to cable 38, it is also possible for further cables, e.g. for temperature sensors etc., to be encapsulated at the same time. It is then no longer necessary to seal the piston rod 32. It is also possible to integrate an anti-twist safeguard for the piston rod. The piston rod can be shaped in the connection region in such a way that a positive connection to the piston is obtained through overlaps with the solidifying medium.

As an alternative, the cable 38 can also be additionally sealed (O-rings; special screwed joint etc.). For this purpose, soldering pins or finished plug-in parts can be molded in or cast in directly on the coil and/or the piston.

In order to ensure leaktightness between the inserted part after overmolding with injected plastic or the encapsulating compound 10, they can be coated with hot melt adhesive or the like. It is thereby possible to compensate for stresses which arise between the various components, especially in the event of temperature changes.

The wire used for the electric coils 19 can be provided with a shrink-on sleeve, which is coated internally, externally or internally and externally with hot melt adhesive.

Use is preferably made of the arrangement visible in FIG. 2 having a "horizontal" electric coil device 19, in which the coil holder 23, the core 20 and the dividing walls 11 are encapsulated. For this purpose, a corresponding mold 40 and, in particular, a negative mold, is preferably used. This unit can then be inserted into the remainder of the magnetic field circuit, e.g. a piston 30 or a valve. After this, a firm and leakedtight connection is produced, which is stable at least up to certain axial forces. The connection can be accomplished by adhesive bonding, ultrasonic welding, hot melt adhesive or a thread.

It is also possible to produce the connection by means of an injection process. For this purpose, it is also possible for the solidifying medium or the encapsulating compound to be injected. "Encapsulation" is also intended to include injection. Preferably, overmolding is performed with plastic.

In one variant, the coil device 19 can be ready-overmolded and, in this case, preferably forms "partition holders" projecting slightly outward. Together with the dividing wall 11 (partition), the coil device 19 is pushed into the piston 30, as a result of which the partition holders are pressed inward and firmly clamp the dividing wall 11.

In another variant, it is possible to use partition holders which are similar to those above but are part of the coil holder. The core, the coil holder with the coil device 19 and the dividing walls 11 are pushed into the piston, during which process the projecting tabs of the partition holder bend and are pressed against the dividing wall 11. By this means, the dividing wall 11 is held in position and the flow passage is sealed off from the coil device 19, simplifying encapsulation.

Also possible is ultrasonic welding, during which the unit influencing the flow passage is produced. A dividing wall 11 can be incorporated or welded in subsequently by means of ultrasonic welding. In this case, the dividing wall 11 can be encased in the solidifying medium or in the encapsulating compound at the faces or radially from the outside inward (in the direction of the core center).

An alternative production method envisages encapsulating or overmolding the core together with the coil holder and coil with plastic in a mold in such a way that the regions of the flow passages and dividing walls remain free. This part is secured in the piston main body in a further work step, together with the dividing walls.

As a particularly preferred option, the plastic is injected with a slight oversize or through a particular mold in the region of the dividing walls in such a way that the dividing walls are clamped by the plastic when pressed into the piston main body.

The mold for the plastic can also have latching hooks and the like in order to allow simple fixing in the piston main body. The piston rod or dividing walls can likewise be fastened.

It is not absolutely necessary that the divider 2 should influence the entire flow of the magnetorheological fluid along the resulting flow passage 3, 4. The structure can also have one or more flow passages which can extend outside and/or inside the subassembly.

It is not absolutely essential that a plurality of dividing plates 12 within one variant should have the same dimensions. They can also be different.

It is also possible for a core 20 to be constructed from a multiplicity of flow passages with dividing plates 12.

In all the embodiments, at least one dividing wall 11 can also be made a fixed component part of the field closing device 9 or of the magnetic field generating device 8 by means of at least one narrow web, without being restricted thereto, if said web is produced by wire cutting, precision casting or a similar method for producing fine structures, for example.

The magnetic field does not always have to be closed via the field closing device 9, as illustrated in FIG. 2 for example, but can be closed exclusively via component 43 (cylinder . . . ). For example, the piston shown in FIG. 8 can run directly in a cylinder, without a rear collar 46. The magnetic field can also be closed via the field closing device 9 and component 43 (cylinder . . . ). In that case, however, the cylinder 43 must have at least partially ferromagnetic properties.

| List of reference signs: | |
| --- | --- |
| 1 | subassembly |
| 2 | divider |
| 3 | flow passage |
| 4 | flow passage |
| 5 | flow path |
| 6 | flow path |
| 7 | component |
| 8 | magnetic field generating device |
| 9 | field closing device |
| 10 | solidifying medium |
| 11 | dividing wall |
| 12 | dividing plate |
| 13 | latching device |
| 14 | latching tooth |
| 15 | flow direction |
| 16 | width |
| 17 | height |
| 18 | length |
| 19 | electric coil device |
| 20 | core |
| 21 | longitudinal axis |
| 22 | constriction |
| 23 | coil holder |
| 24 | pole cap |
| 25 | pole cap |
| 26 | axis |

| List of reference signs: | |
|---|---|
| 27 | insert |
| 28 | stack |
| 29 | placeholder |
| 30 | piston |
| 31 | piston guide |
| 32 | piston rod |
| 33 | longitudinal axis |
| 34 | latching means |
| 35 | piston main body |
| 36 | dividing template |
| 37 | dividing template |
| 38 | cable |
| 39 | shallow cross section |
| 40 | mold |
| 41 | dividing piston |
| 42 | compensating space |
| 43 | housing |
| 44 | assembly hole, bypass passage |
| 45 | undercut, groove |
| 46 | offset |
| 47 | thickness |
| 48 | collecting space |
| 49 | opening |
| 50 | damper |
| 51 | seal |

The invention claimed is:

1. A method of producing a subassembly having a dividing body, the dividing body having:
 at least one flow passage extending along the dividing body and defining at least one flow path in order to influence a flow of a magnetorheological fluid along the flow passage of the dividing body; and
 at least one magnetic field generating device for generating a magnetic field and a field closing device;
 the method comprising:
 filling the magnetic field generating device and the field closing device with a solidifying medium, while using at least one placeholder for forming at least part of the flow passage, the at least one placeholder, upon the removal thereof, forming on the dividing body the at least one flow passage.

2. The method according to claim 1, which comprises forming a connection with the solidifying medium hydraulically pressure-tight, forcing the magnetorheological fluid to flow via the flow passage.

3. The method according to claim 2, which comprises surrounding a core with a coil holder, and winding an electric coil device being the magnetic field generating device onto the coil holder.

4. The method according to claim 3, which comprises placing at least one dividing wall on the coil holder.

5. The method according to claim 4, which comprises forming at least one insert from a stack with a first dividing template as the at least one placeholder, the at least one dividing wall, and at least one second dividing template as the placeholder.

6. The method according to claim 1, which comprises forming at least one insert from the at least one placeholder.

7. The method according to claim 1, which comprises introducing a core with a coil holder and an electric coil device and at least one insert into the field closing device.

8. The method according to claim 1, wherein the filling step comprises encapsulating and/or overmolding with the solidifying medium, using defined pressure.

9. The method according to claim 8, which comprises allowing the solidifying medium to cure following a casting operation and subsequently removing the at least one placeholder.

10. The method according to claim 1, which comprises removing the at least one placeholder from the dividing body.

11. The method according to claim 10, wherein the removing step comprises melting, dissolving or washing the placeholder out of the dividing body.

* * * * *